Oct. 30, 1951 — M. SCHWARTZ ET AL — 2,573,655
PHOTOGRAPHIC HOLDER

Filed Jan. 8, 1948 — 3 Sheets-Sheet 1

INVENTORS
MORRIS SCHWARTZ
WILLIAM CASTEDELLO
BY
ATTORNEY

Oct. 30, 1951 M. SCHWARTZ ET AL 2,573,655
PHOTOGRAPHIC HOLDER
Filed Jan. 8, 1948 3 Sheets-Sheet 2
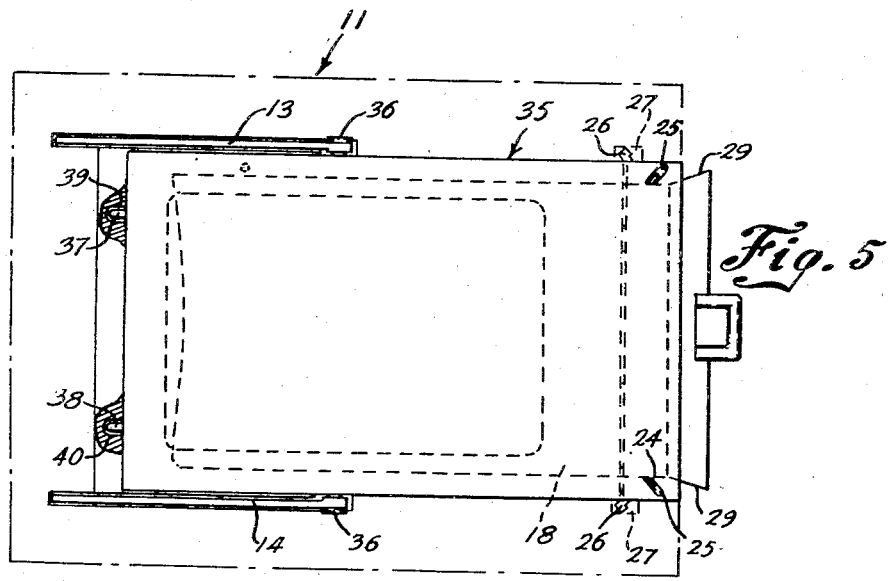
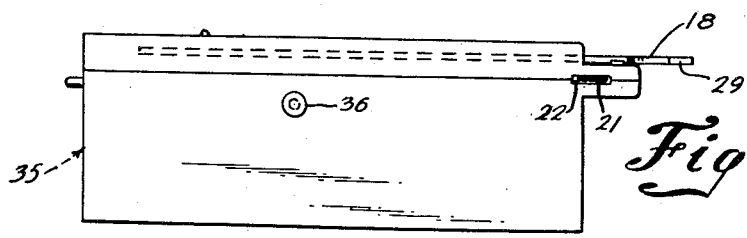
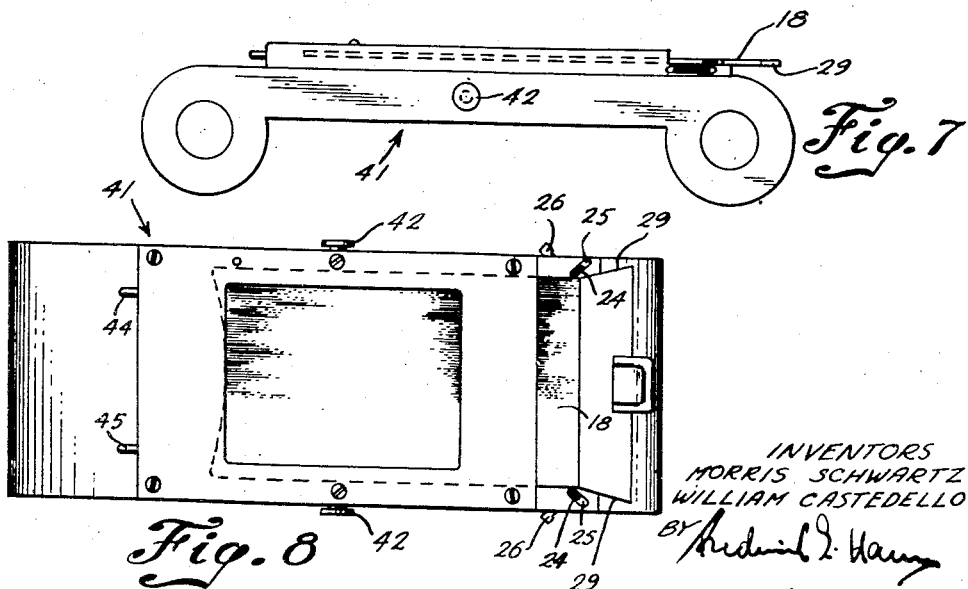
INVENTORS
MORRIS SCHWARTZ
WILLIAM CASTEDELLO
ATTORNEY Oct. 30, 1951 M. SCHWARTZ ET AL 2,573,655
PHOTOGRAPHIC HOLDER
Filed Jan. 8, 1948 3 Sheets-Sheet 3

INVENTORS
MORRIS SCHWARTZ
WILLIAM CASTEDELLO
ATTORNEY

UNITED STATES PATENT OFFICE 2,573,655

PHOTOGRAPHIC HOLDER

Morris Schwartz and William Castedello, Stamford, Conn., assignors to The Kalart Company Inc., Stamford, Conn.

Application January 8, 1948, Serial No. 1,116

8 Claims. (Cl. 95—71)

This invention relates to photographic holders for plates or films and to holders or magazines for cut film, film pack or roll film as are used in connection with various types of photographic apparatus such as cameras, enlargers, etc.

Photographic holders of the general type, above referred to, comprise a frame or casing which is loaded with one or more plates or films. These plates or films are normally covered by a slide which is removed for the purpose of exposure. In photographic practice, it is customary to mark one side of a slide differently from the other one to indicate whether the plate or film covered by a slide is exposed or unexposed; generally a silvered or whitened portion of the slide is provided to indicate an unexposed plate or film contained in the casing while a blackened portion is indicative of an exposed plate or film. According to the practice common in photography, the operator reverses the slide after having made an exposure, thereby placing the blackened slide portion in the position facing the outside.

With certain types of photographic apparatus, such as "Press" cameras, the plate or film holder, which may be of the simplex or the duplex type, is slipped between the camera casing and a spring loaded ground glass back and held in position by the pressure of the back. When now the operator removes the slide of the holder in preparation of making an exposure or reinserts the withdrawn slide, the pushing or pulling force applied to the slide or accidental pressure applied to the spring back may cause a tilting of the holder and the spring back away from the camera casing. As a result, light will reach an exposed portion of the plate or film fogging the same.

The same danger of fogging a film or plate or at least a portion thereof is present with holders or magazines for cut sheet film or roll film. As such magazines or holders are usually too thick to be inserted between the casing and the back, the latter is removed and the magazine or holder is held in position by the pressure of the spring loaded arms of the back. It will be evident from the previous explanation that the magazine may be accidentally tilted away from the camera casing.

Another possibility of fogging a plate or film is due to carelessness on the part of the operator in the removal of the holder or magazine from the camera without completely pushing home the previously withdrawn slide.

With other types of photographic apparatus, the holder or magazine is slid into guiding grooves in the casing of the photographic apparatus. Such guiding grooves secure the holder or magazine positively to the casing thereby eliminating the danger of an accidental tilting of the holder or magazine. However, they cannot prevent the possibility of removing the holder or magazine without completely pushing home a previously withdrawn slide.

Accordingly, it is one of the objects of this invention to provide means which prevent for either type of photographic apparatus any movement of an inserted holder or magazine from its light tight position on or in the casing of the photographic apparatus unless and until a slide withdrawn in preparation of an exposure is completely reinserted.

Another object of the invention is to provide means by which a holder or magazine is positively secured in its light tight position on or in the casing of a photographic apparatus unless and until a slide withdrawn in preparation of an exposure is completely reinserted.

Another object of the invention is to provide means by which a holder or magazine inserted in a photographic apparatus is positively and automatically locked to the photographic apparatus when a slide is partly or completely withdrawn in preparation of an exposure and is automatically unlocked when the slide is completely reinserted.

Another object of the invention that is particularly useful in connection with magazines for cut film, film packs, adaptors or roll film holders is to provide means by which a magazine that is impositively held against the casing of a photographic apparatus by means of spring loaded arms is automatically locked to the casing at spaced points when a slide is partly or completely withdrawn and is automatically unlocked when the slide is completely reinserted. Such an arrangement has the advantage that the magazine cannot be tilted away from the camera at either end.

The term "photographic holder" as sometimes used herein, is intended to include any type of holders for one or more sensitized layers such as plate or film holders, magazines for cut film, film pack adaptors or roll film adaptors and containers.

Other and further objects, features and advantages of the invention will appear hereinafter and be pointed out in the claims forming part of the application.

Certain features and elements of plate or film holders and of magazines for pack film or roll film that are disclosed in the present application but are not made the subject matter of claims are claimed in the co-pending application Ser. No. 790,784, filed by Morris Schwartz and William Castedello on December 10, 1947.

In the accompanying drawings several now preferred embodiments of the invention are shown by way of illustration and not by way of limitation.

In the drawings:

Fig. 5 shows a plan view of a magazine for cut film equipped with locking means according to the invention, the magazine being shown inserted into a photographic apparatus.

Fig. 6 is a side view of the magazine according to Fig. 5.

Fig. 7 is a side view of a holder for roll film equipped with locking means according to the invention.

Fig. 8 is a plan view of the holder according to Fig. 7.

Figure 1:
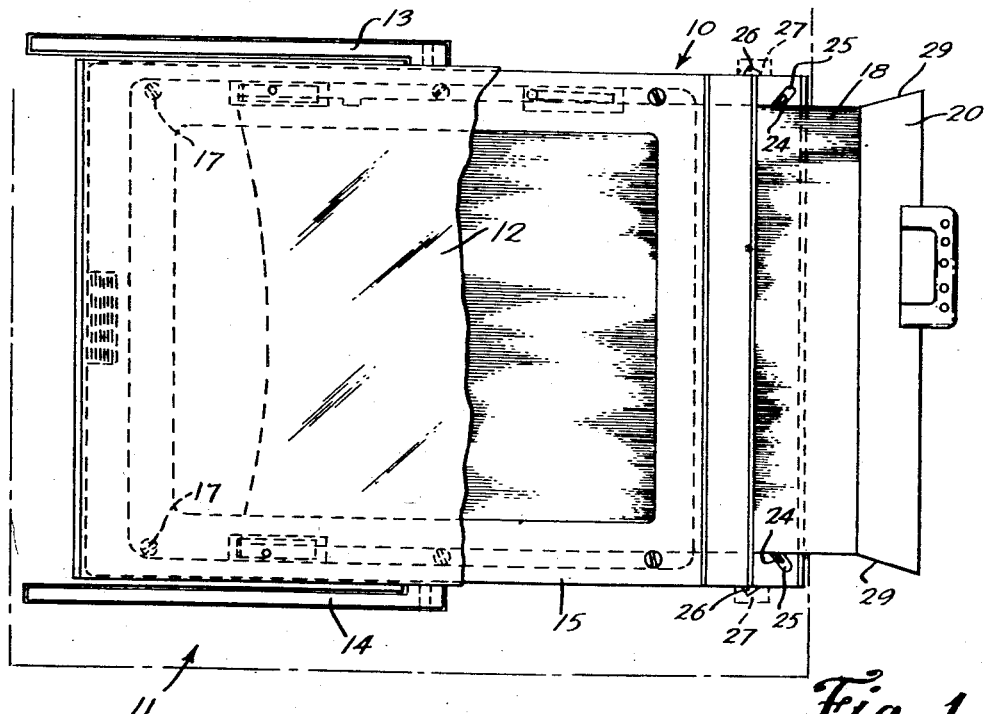
Fig. 1 is a plan view of a plate or film holder according to the invention inserted in a camera.

Referring now to the figures in detail:

Fig. 1 shows a plate or film holder of the duplex type, generally designated by 10, inserted in a camera generally designated by 11, the outline of the camera casing being indicated by dotted lines. The camera is shown as being of the so-called "press" type equipped with a spring back 12. Spring loaded arms 13 and 14 serve to press the back against the camera casing. The back is only partially illustrated to show the plate or film holder.

Figure 2:
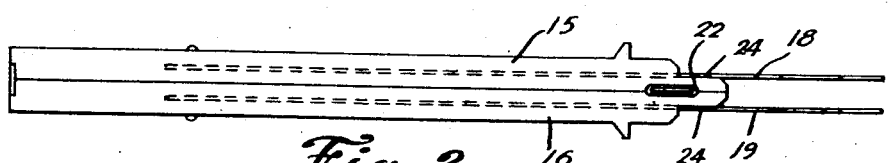
Fig. 2 is a side view of the plate or film holder according to Fig. 1.

As can be seen on Fig. 2, the casing of the holder is composed of two sections 15 and 16, respectively joined together by screws 17 or any other suitable means. The casing is arranged to caintain a septum (not shown) supporting on each side a plate or film in a conventional manner. One of the sensitized layers is normally covered by a slide 18 and the other by a slide 19. Portions 20 of each slide are marked differently on each side to indicate whether a plate or film covered by a slide is exposed or not. Conventionally, the slide portion facing the outside when the respective sensitized layer is unexposed is silvered or whitened while the opposite side is blackened. Slide 18 in Fig. 1 is assumed to cover an unexposed sensitized layer.

In the subsequent description, the arrangement and function of the plate or film holder will be described for one half of the holder as a matter of convenience and it should be understood that the second half of the holder is a duplication of the described half.

*Means for locking an inserted plate or film holder to the back of a camera*

Figure 3:
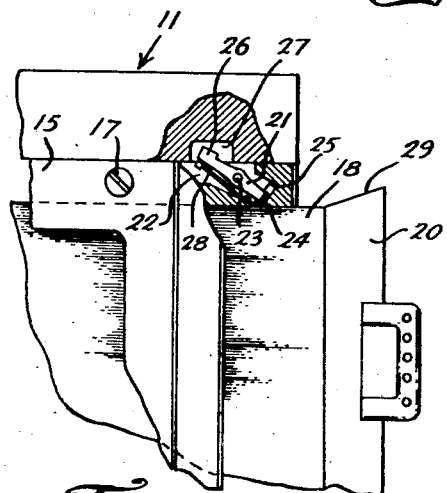
Fig. 3 shows a detail view, partly in section, of the locking means for locking the holder to the camera.
Figure 4:
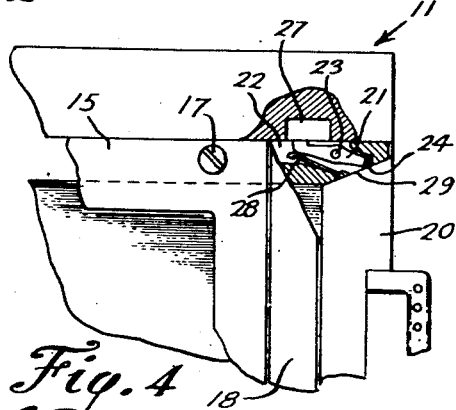
Fig. 4 shows a detail view of the same locking means in a different position of the locking elements.

The means for locking an inserted plate or film holder to the camera, as best shown in Figs. 3 and 4, comprise a two-arm lever 21 pivotally disposed in a recess 22 of holder section 15 by means of a pivot 23. One arm of lever 21 is provided with a bent-off nose 24 which is extended through an elongated slot 25 in casing section 15. Slot 25 is shaped and positioned to permit a pivotal movement of lever 21 within recess 22. The other end of lever 21 is also provided with a nose 26 which engages a notch 27 in the frame of the camera back when the lever 21 is in the position shown in Fig. 3 and is withdrawn from the notch when the lever is in the position shown in Fig. 4. As can best be seen from Fig. 1, nose 26 is adjacent to notch 27 when the plate or film holder is fully inserted in the camera.

A spring 28 urges lever 21 into the engaging position shown in Fig. 3.

The locking means according to Figs. 3 and 4 are provided at opposite edges of the holder as can be seen in Fig. 1, one pair of locking means being associated with each half of the holder. The positions of levers 21 are controlled by the position of the respective slide 18 or 19. For this purpose, the portion 20 of each slide is slanted at 29 so that slanted edges 29 will engage noses 24, when a slide is pushed home, and pivot levers 21 into positions in which the noses 24 are withdrawn from notches 27 in the camera frame as shown in Fig. 4.

The operation of the plate or film holder locking means is as follows:

As previously mentioned, with cameras of the type equipped with a spring back, the plate or film holder is inserted in the camera by being pushed between the spring back and the camera casing proper and is held in position by the pressure exerted by spring arms 13 and 14 upon spring back 12.

When the plate or film holder is placed in the camera, all noses 26 are withdrawn as the slides are fully inserted. When now the operator withdraws the slide facing the camera objective, slide edges 29 become disengaged from the respective noses 24. As a result, springs 28 push noses 26 into notches 27 so that the holder is not only held by the pressure of the spring back but positively and automatically locked to the camera casing. Hence, the holder cannot be tilted away from the camera casing even though the spring back may be tilted. Furthermore, the holder can be removed from the camera only when the slide is completely reinserted thereby automatically unlocking the holder by the coaction between slide edges 29 and levers 21.

Figs. 5 and 6 show the application of the holder locking means, as described in connection with Figs. 3 and 4, to a magazine for cut film, generally designated by 35, the slide 18 of the magazine being shown partly withdrawn. As previously mentioned, the thickness of such magazines usually prevents an insertion of the magazine between spring back and camera casing. It is therefore customary to remove the spring back and to slip spring arms 13 and 14 over corresponding noses 36 on the side walls of the magazine. As will be apparent, the same dangers of fogging one of the films in the magazine by tilting the magazine or by removing the magazine without completely pushing home the slide exist as were previously described for a plate or film holder. These dangers are eliminated for magazines by providing locking means as shown in Figs. 3 and 4 for the magazine so that the magazine is automatically locked to the camera when a slide is withdrawn and until the slide is completely reinserted.

It will be apparent from Fig. 5, the locking means lock the magazine at the end at which the slide is inserted. This leaves the possibility of a lifting of the magazine away from the camera at the opposite end since this end of the magazine is not secured by a spring back as is a plate or film holder. To secure the second end of the magazine also, pins 37 and 38 are provided on end wall of the magazine which engages corresponding holes 39 and 40 respectively, in the end wall of the guiding frame of the camera casing when the magazine is inserted. The magazine is now positively secured by locks at both ends and also by the pressure of spring arms 13 and 14.

Figs. 7 and 8 show the application of the locking means according to Figs. 3 and 4 to a roll film holder, generally designated by 41, the slide 18 being shown partly withdrawn. Such holder is secured to the camera after removal of the spring back by hooking spring arms 13 and 14 over noses 42 on the holder. As a result, the holder cannot be tilted away from the camera or removed without completely reinserting the slide, as has been described in connection with a plate or film holder and a magazine for cut film.

According to the invention, holder 41 is secured to the camera casing by providing locking means as shown in detail on Figs. 3 and 4 and holding pins 44 and 45 engaging corresponding holes 39 and 40 in the camera casing, thereby positively securing the film holder at both ends and pressing it against the camera in the middle.

Figure 9:
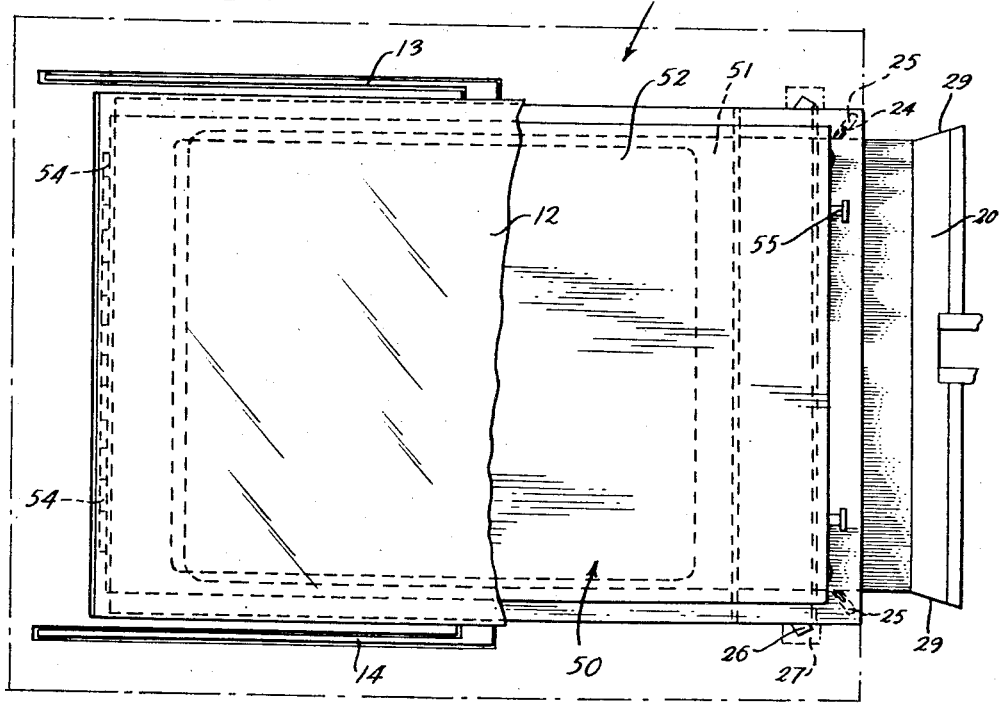
Fig. 9 is a plan view of a film pack adapter according to the invention inserted in a camera.
Figure 10:
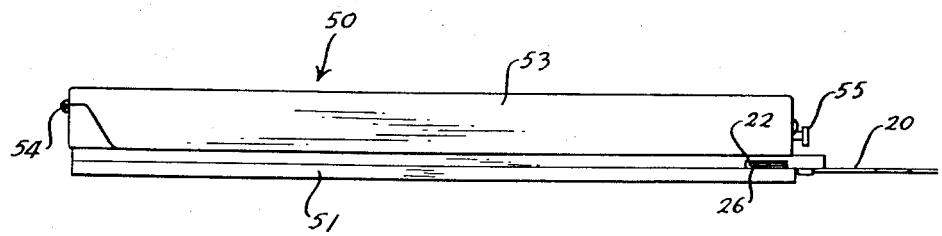
Fig. 10 is a side view of the film pack adapter according to Fig. 9.

According to Figs. 9 and 10, the film pack adapter is shown inserted in a camera 11 and held in position by the pressure of ground glass back 12 and spring arms 13 and 14 as has been described in connection with the plate or film holder shown on Fig. 1. The adapter may be of conventional design and is generally designated by 50. It comprises a frame 51 including a window 52 and a case 53. Case 53 serves to house the film pack. It is hinged to frame 51 by hinges 54 and held in its closed position by conventional locking means indicated by buttons 55. A slide 20 is provided to cover and uncover the film in the holder.

As will be evident from the previous description, a fogging of film in holder 50 is possible by accidentally tilting the adapter away from the camera casing, or by removing the adapter without completely reinserting slide 20. Both these possibilities of fogging are eliminated by providing locking means according to the invention as shown in detail on Figs. 3 and 4 and described in connection therewith. The locking means according to the invention automatically lock the adapter to the camera when and while slide 20 is partly or completely withdrawn from the adapter.

It should be noted in this connection that the film pack adapter can also be used without employing a ground glass back to press the adapter against the camera casing. The adapter is then secured to the camera casing by providing pins 37, 38 and recesses 39, 40 as shown in Fig. 5. In many instances these pins and locking ears 26 will be sufficient to secure the adapter. However, if desired, the adapter may be further secured by spring arms such as 13 and 14 which may be hooked over corresponding noses on the adapter such as 36 or 42.

While the invention has been described in detail with respect to certain now preferred examples and embodiments of the invention it will be understood by those skilled in the art after understanding the invention, that various changes and modifications may be made without departing from the spirit and scope of the invention and it is intended therefore, to cover all such changes and modifications in the appended claims.

What is claimed as new and desired to be secured by Letters Patent is:

1. A photographic holder of the type comprising a casing having a slide insertion slot therein, and a removable rigid slide adapted to be inserted in said slot for covering and uncovering a sensitized layer in the casing, in combination with locking means mounted on the casing adjacent to the entrance of said insertion slot, said locking means including a locking member pivotally mounted to form a two-arm lever, a first arm of said lever protruding outwardly from an outer side wall of the casing in a predetermined pivotal position of the locking member and the second arm extending from the face of the casing and into the path of a slide portion protruding from the casing at the entrance of the slide insertion slot when the slide is fully inserted in said slot, the said slide portion slidably engaging the second arm and pivoting the locking member into a position in which said first arm is within the confines of the casing in response to a complete insertion of the slide, said locking member, when in a position in which said first arm protrudes from the casing, being capable of locking the holder to a photographic apparatus in which the holder is inserted.

2. The combination of a photographic apparatus having a casing including a guiding frame for receiving a photographic holder, spring means provided on the casing for impositively pressing said holder against the casing in a light tight position, said guiding frame having a recess in one of its wall portions; a photographic holder of the class described comprising a casing having a top edge and a bottom edge and two side edges engageable with corresponding portions of said guiding frame, said top edge including a slot therein, a removable rigid slide for covering and uncovering a sensitized layer in the casing adapted to be inserted in said slot, and locking means mounted on the holder casing near the entrance of said insertion slot, said locking means including a locking member pivotally mounted within a slot in one of the side edges of the holder casing engaging the said guiding frame, spring means on the holder casing biasing the locking member into a position outwardly protruding from the side edge of the holder casing including said slot, said slide insertion slot and said locking member being arranged in a relative position in which the slide slidably engages the locking member and pivots the same into a position withdrawn into the casing in response to a complete insertion of the slide, said locking member, when outwardly protruding from the casing, engaging said recess in the guiding frame, thereby positively locking the holder to the photographic apparatus when the slide is in a position other than fully inserted; and second locking means positioned at the bottom edge of the guiding frame and the holder casing, said second locking means including a locking element at the guiding frame and a second locking element on the holder casing, said locking elements being arranged and positioned to positively engage each other when the holder is fully inserted in the photographic apparatus so as to prevent a tilting of the holder at its bottom edge away from its light tight position on the casing of the photographic apparatus.

3. The combination as described in claim 2, wherein said second locking means comprise a pin extending from the bottom edge of the holder casing and positioned to engage a corresponding recess in the guiding frame when a holder is fully inserted in the casing of the photographic apparatus.

4. In a photographic holder, in combination a casing having a slide insertion slot in one of its side walls, a removable slide for covering and uncovering a sensitized layer inserted in the casing, said slide being adapted to be inserted in said slot and having a portion protruding from the respective casing side when said slide is completely inserted in the holder in a position covering said layer, locking means mounted on the casing, said locking means comprising a pivotally mounted locking member mounted in the casing and positioned adjacent to the entrance of said slide insertion slot, and spring means biasing the locking member into a locking position in which the said member protrudes outwardly from one of the side walls of the casing adjacent to the side wall having said slide insertion slot therein, said protruding slide portion and said locking member being disposed in a relative position in which the said protruding slide portion is capable of slidably engaging said locking member for moving the same into a release position within the confines of the holder casing in response to a complete insertion of the slide, said locking member, when in locking position being capable of locking the holder to a photographic apparatus in which the holder is inserted.

5. In a photographic holder, in combination a casing including a slide insertion slot in one of its side walls and a second slot having an exit opening into one of the outer casing side walls adjacent to the side wall having said slide insertion slot therein and a second exit in a face wall of the casing, said second exit being positioned adjacent to one of the edges of said slide insertion slot, a locking member pivotally mounted within said second slot so as to form a two-arm lever, one arm of said lever being arranged to protrude outwardly from said first exit in one lever position and to be withdrawn into the second slot in another lever position, the second arm of the lever protruding from the second exit, spring means on the casing urging said lever into its first mentioned position, and a slide for covering and uncovering a sensitized layer inserted in said casing, said slide being adapted to be inserted in the respective slot and having a portion protruding from the casing when the slide is fully inserted in the casing, said slide insertion slot and said second exit being positioned in a relative position in which said protruding portion of the slide is capable of slidably engaging the second lever arm for pivoting the lever into a position in which the first arm thereof is withdrawn into the casing in response to a complete insertion of the slide, said first arm, when protruding from the casing, being capable of locking the holder to a photographic apparatus in which the holder is inserted.

6. A holder as described in claim 5, wherein the slide portion protruding from the casing, when the slide is fully inserted in the casing, includes a slanted slide edge positioned to slidably engage said second lever arm in response to an approximately complete insertion of the slide for pivoting the said lever into its withdrawn position upon completion of the slide insertion.

7. A holder as described in claim 4, wherein a set of the said locking means is provided on each outer side wall adjacent to the side wall of the casing having said slide insertion slot therein.

8. The combination of a photographic apparatus having a casing including a guide frame for receiving a photographic holder in a light tight position, said guide frame having a notch in one of its side walls; and a photographic holder comprising a casing including a slide insertion slot in one of its outer side walls and a second slot having an exit in one of the outer side walls of the holder casing adjacent to the side wall thereof having said slide insertion slot therein and a second exit opening in a face wall of the holder casing, said second exit being positioned adjacent to one of the short edges of said insertion slot, a locking member pivotally mounted within the second slot to form a two-arm lever, one arm of said lever being arranged to protrude outwardly from the first exit in one lever position and to be withdrawn into the second slot in another lever position, the second arm of the lever protruding from the second exit, spring means on the holder casing biasing said lever into its first mentioned position, and a slide for covering and uncovering a sensitized layer in said holder casing, said slide being adapted to be inserted in the slide insertion slot and having a portion protruding from the holder casing when the slide is fully inserted, said slide insertion slot and said second exit being in a relative position in which said protruding portion of the slide is capable of slidably engaging the second lever arm for pivoting the lever into a position in which the first arm thereof is withdrawn into the holder casing in response to a complete insertion of the slide, said second arm when protruding from the holder casing engaging said notch in the apparatus casing, thereby positively locking an inserted holder to the photographic apparatus in said light tight position.

MORRIS SCHWARTZ.
WILLIAM CASTEDELLO.

REFERENCES CITED

The following references are of record in the file of this patent:

UNITED STATES PATENTS

| Number | Name | Date |
| --- | --- | --- |
| 484,569 | Pierce | Oct. 18, 1892 |
| 917,135 | Robertson | Apr. 6, 1909 |

FOREIGN PATENTS

| Number | Country | Date |
| --- | --- | --- |
| 12,126 | Great Britain | of 1913 |
| 303,867 | Germany | July 15, 1919 |